Figure 9:
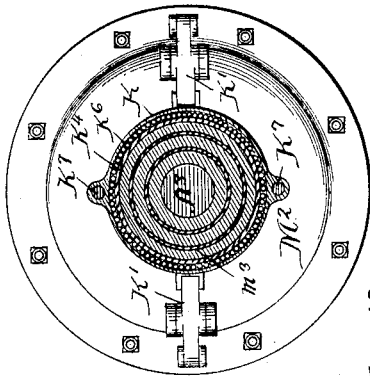
Figure 10:
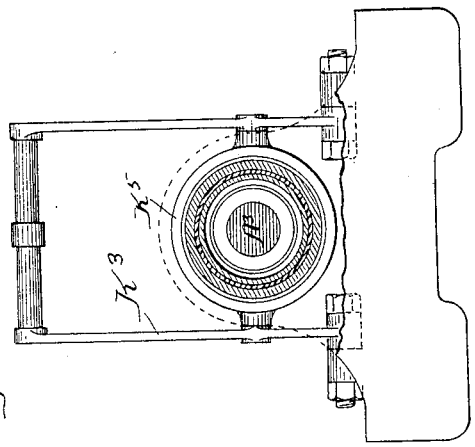
Figure 12:
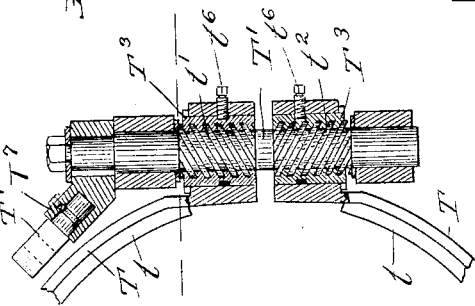
Figure 11:
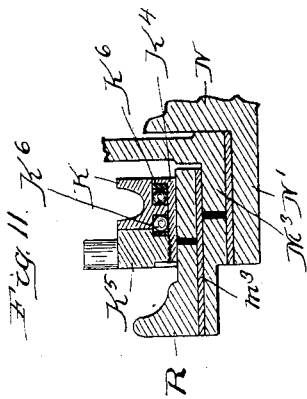

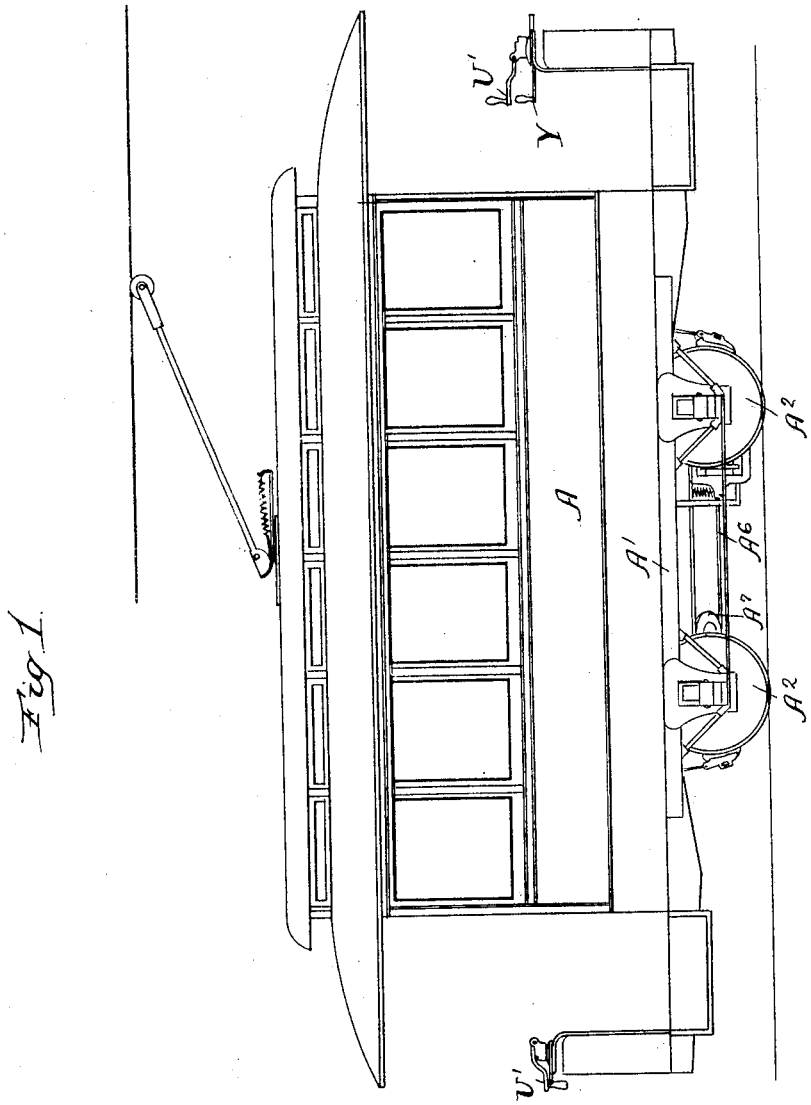

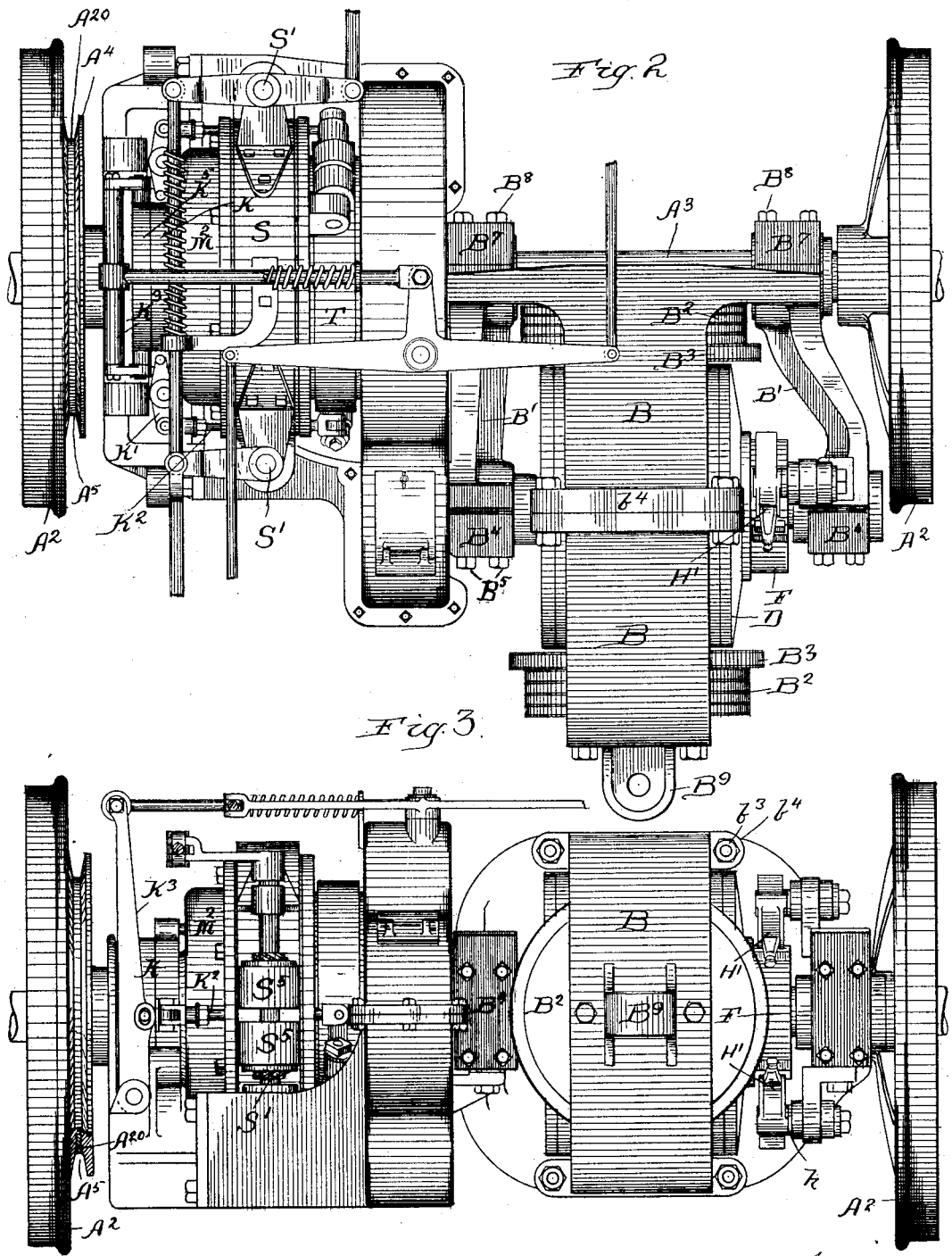

(No Model.) 12 Sheets—Sheet 3.
H. P. BROWN.
ELECTRIC MOTOR CAR.
No. 589,543. Patented Sept. 7, 1897.
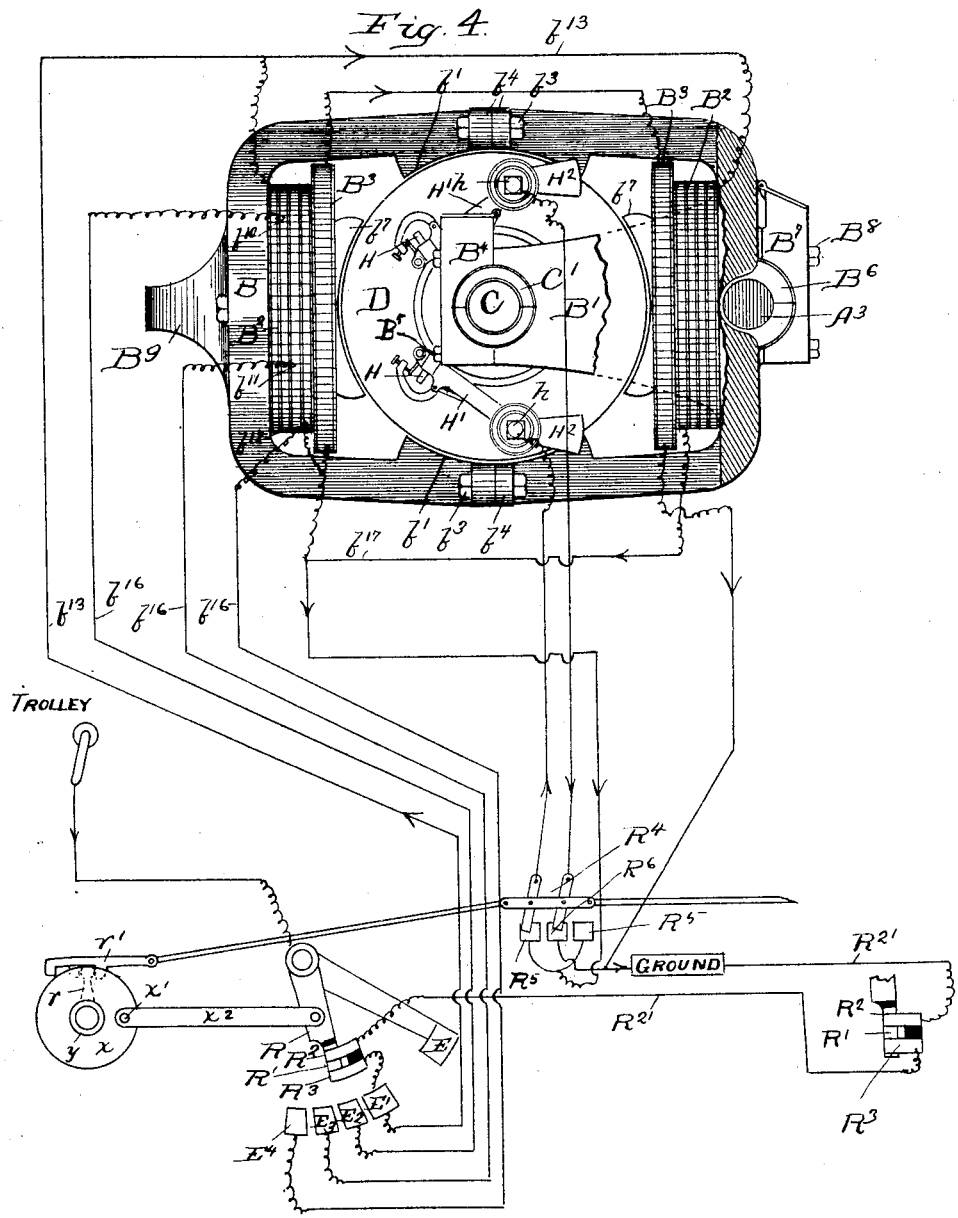
Witnesses:
Lew. C. Curtis
H. W. Munday
Inventor:
Harold P. Brown
By Munday, Evarts & Adcock.
his Attorneys (No Model.)  12 Sheets—Sheet 4.
H. P. BROWN.
ELECTRIC MOTOR CAR.
No. 589,543.  Patented Sept. 7, 1897.
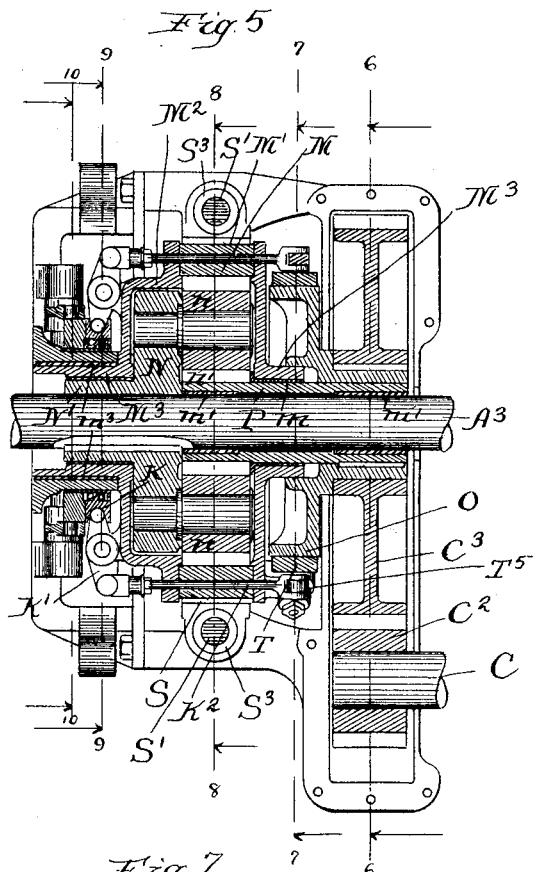
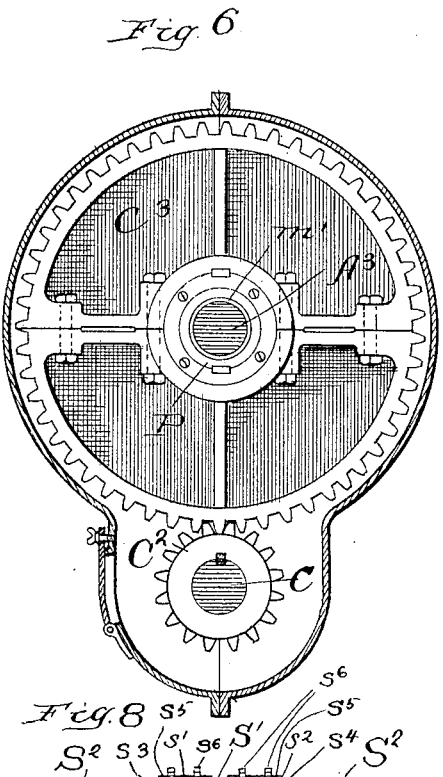
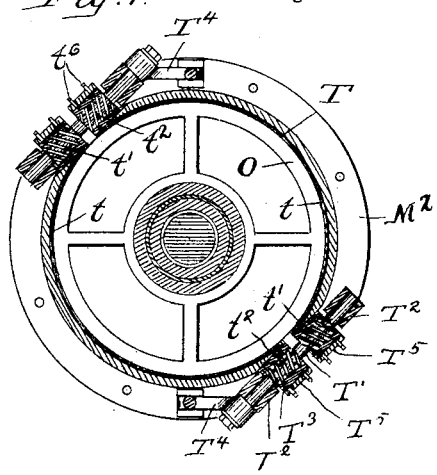
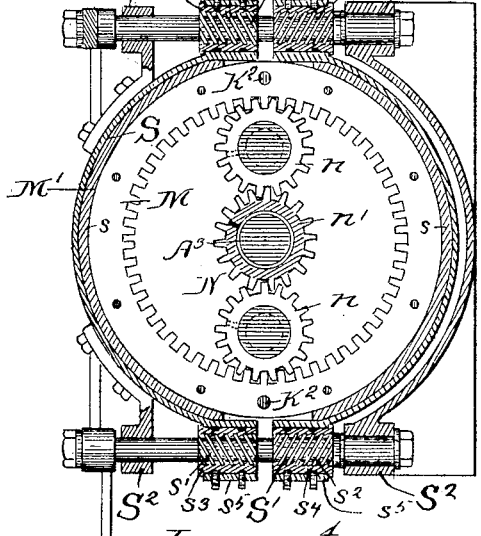
Witnesses:
Geo. E. Curtis
H. W. Munday
Inventor:
Harold P. Brown
By Munday, Evarts & Adcock,
his Attorneys.

(No Model.) 12 Sheets—Sheet 5.

H. P. BROWN.
ELECTRIC MOTOR CAR.

No. 589,543. Patented Sept. 7, 1897.

Witnesses:
Lew. E. Curtis
A. W. Munday

Inventor:
Harold P. Brown
By Munday, Evarts & Adcock
His Attorneys.

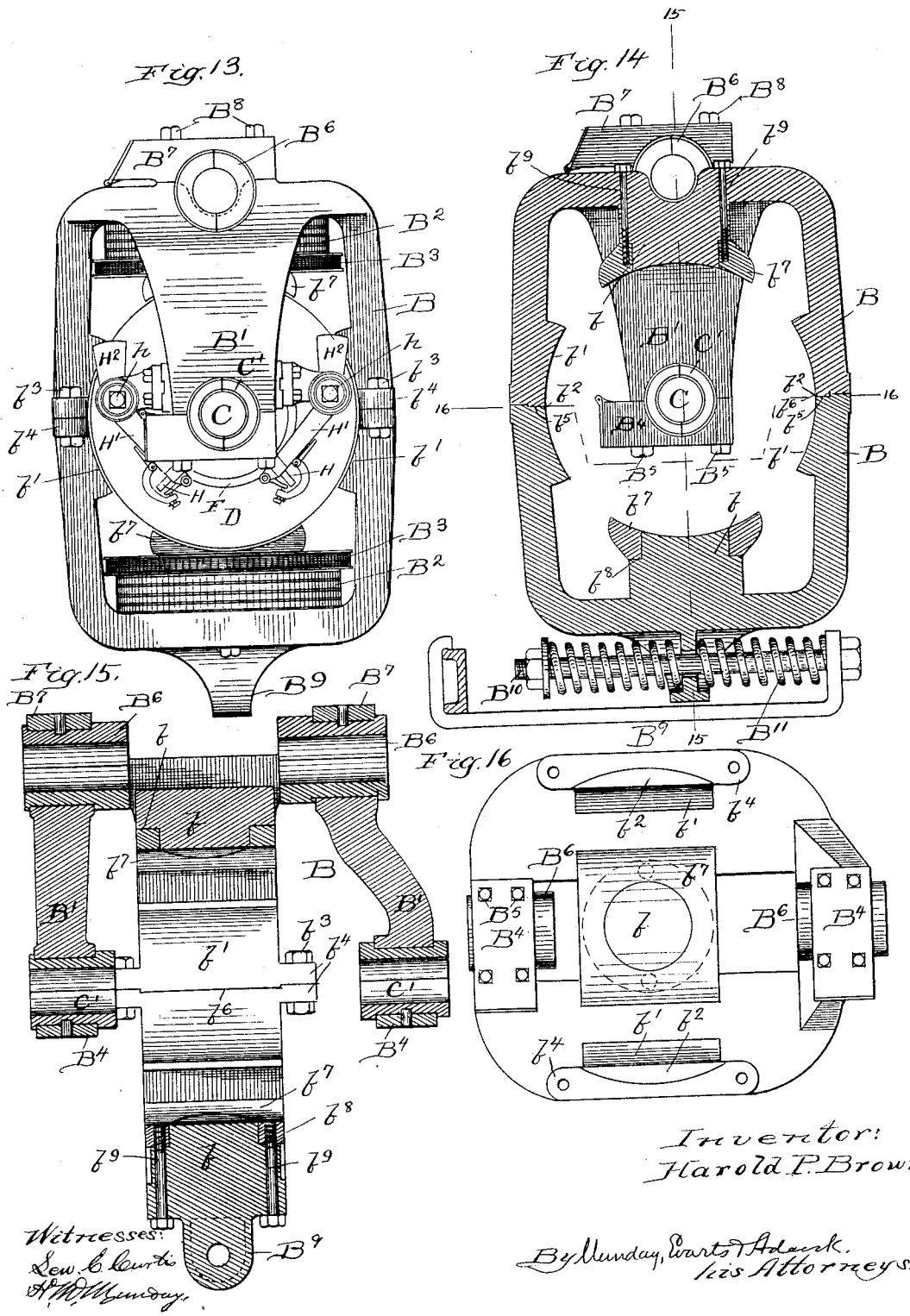

(No Model.)  H. P. BROWN.  12 Sheets—Sheet 7.
ELECTRIC MOTOR CAR.
No. 589,543.  Patented Sept. 7, 1897.
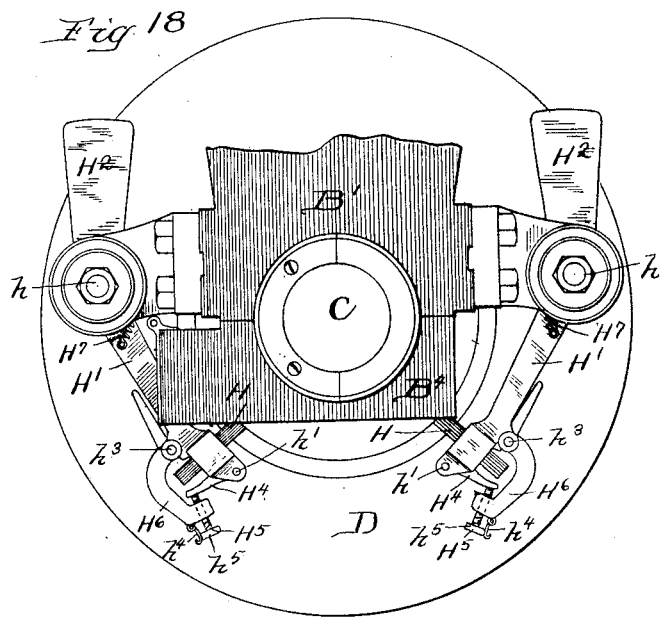
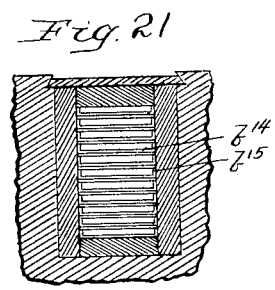
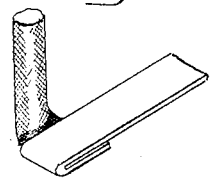
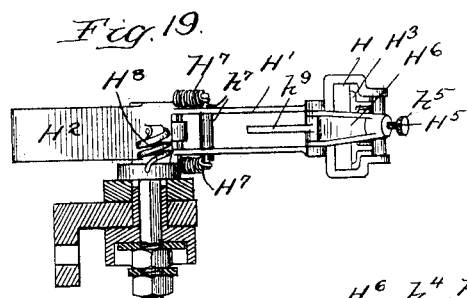
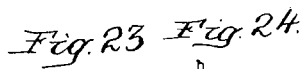
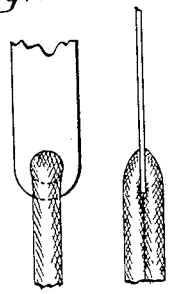
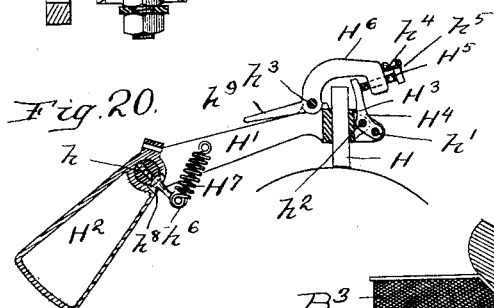
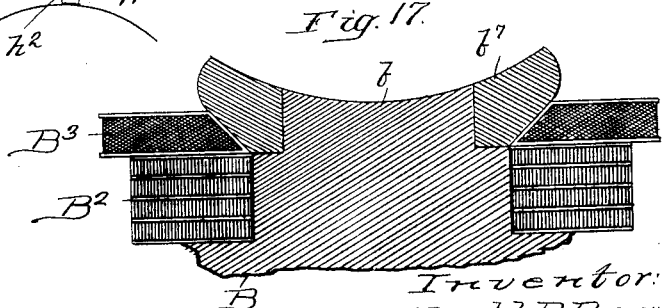
Witnesses:
Lew. E. Curtis
A. W. Munday
Inventor:
Harold P. Brown
By Munday, Evarts & Adcock.
His Attorneys.

(No Model.) 12 Sheets—Sheet 8.

H. P. BROWN.
ELECTRIC MOTOR CAR.

No. 589,543. Patented Sept. 7, 1897.

Witnesses: Inventor:
Sew. C. Curtis Harold P. Brown
H. W. Munday, By Munday, Evarts & Adcock.
His Attorneys.

THE NORRIS PETERS CO., PHOTO-LITHO., WASHINGTON, D. C.

(No Model.)   H. P. BROWN.   12 Sheets—Sheet 9.
ELECTRIC MOTOR CAR.

No. 589,543.   Patented Sept. 7, 1897.

Witnesses:
Sew. E. Curtis
H. W. Munday

Inventor:
Harold P. Brown
By Munday, Evarts & Adcock,
his Attorneys.

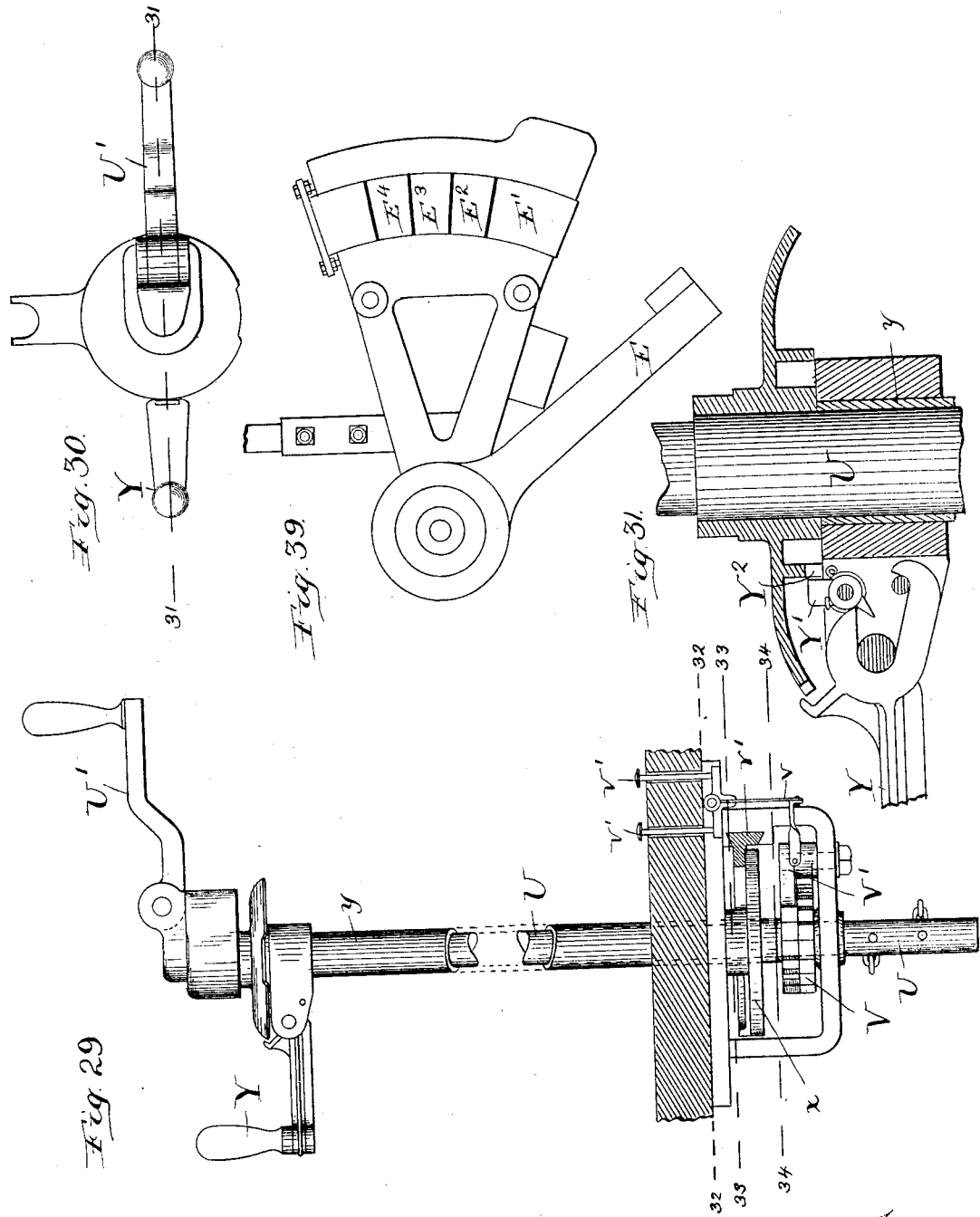

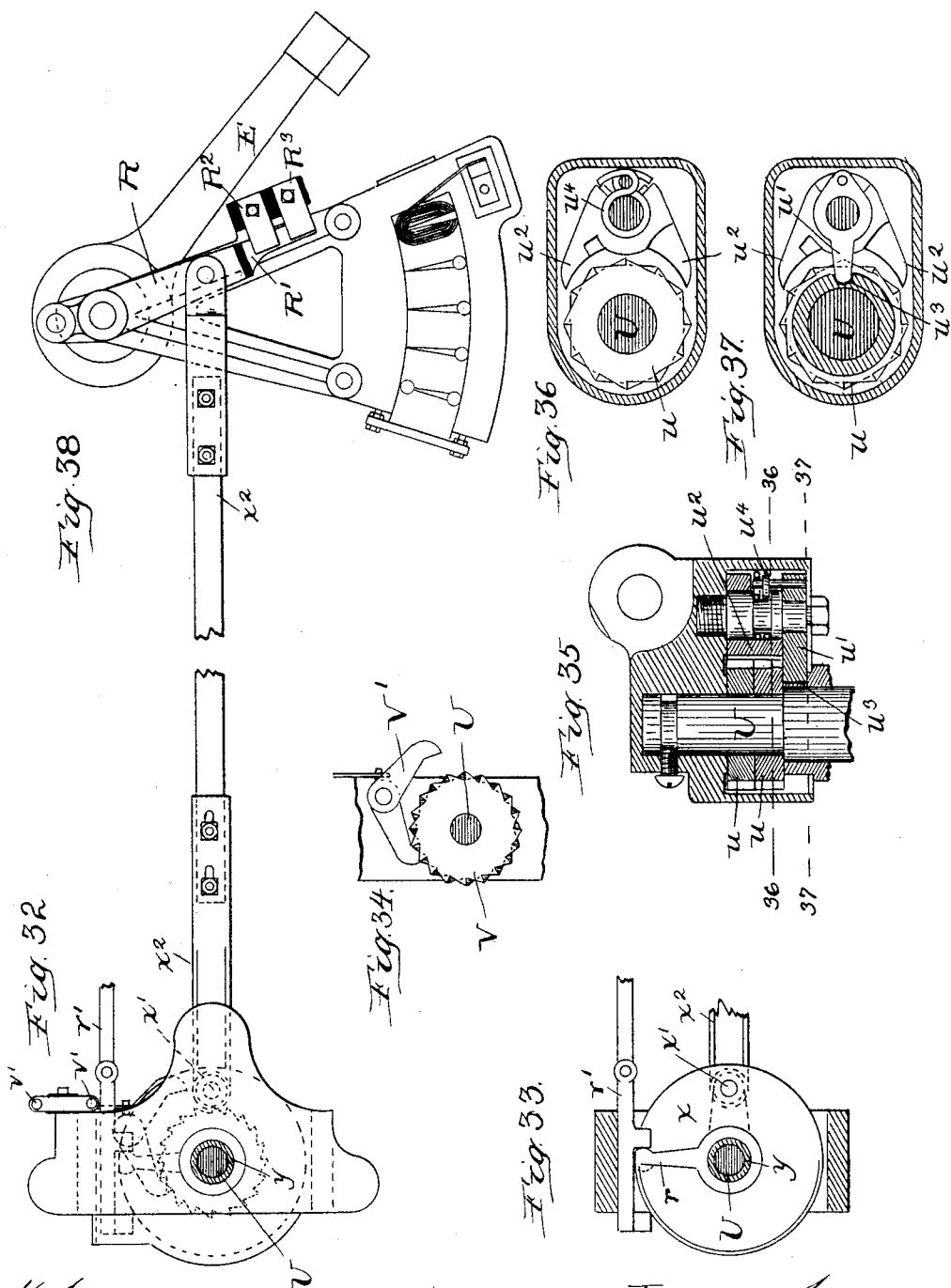

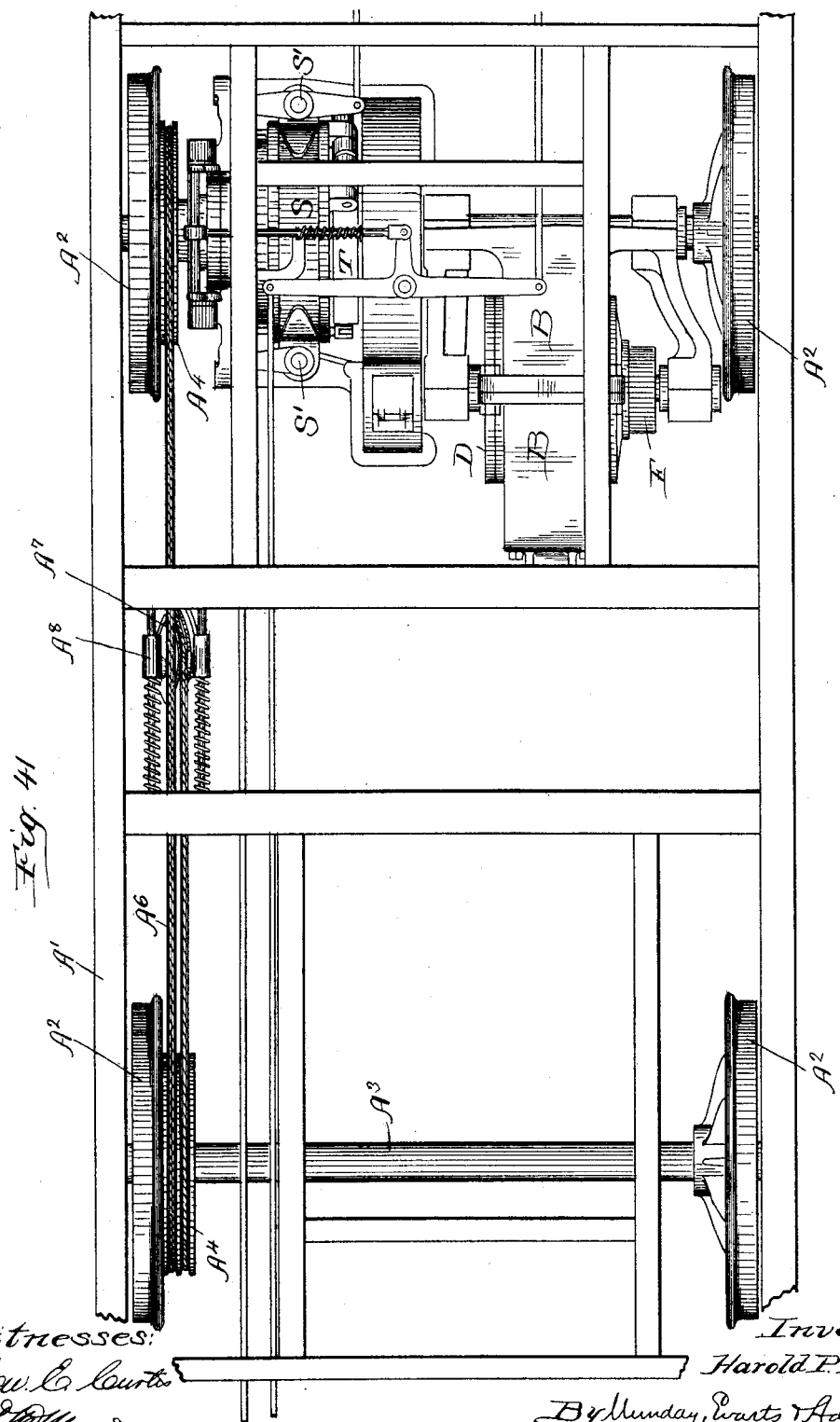

UNITED STATES PATENT OFFICE.

HAROLD P. BROWN, OF NEW YORK, N. Y.

ELECTRIC-MOTOR CAR.

SPECIFICATION forming part of Letters Patent No. 589,543, dated September 7, 1897.

Application filed March 11, 1893. Serial No. 465,630. (No model.)

*To all whom it may concern:*

Be it known that I, HAROLD P. BROWN, a citizen of the United States, residing in New York, in the county of New York and State of New York, have invented a new and useful Improvement in Electric-Motor Cars, of which the following is a specification.

My invention relates to improvements in electric-motor cars.

The object of my invention is to provide an electric-motor car of a simple, efficient, and durable construction wherein the armature of the motor starts with no load and therefore no excessive waste of current, as the armature almost instantly acquires its proper or most economical speed, and wherein also the car is started with the armature already in motion and running at its most economical speed, whereby the car may be started at a ratio or leverage, for example, of fourteeen to one, as between armature and car-axle, and which automatically changes to three and a half to one as the car acquires speed; whereby also the car may be gradually started or stopped without jerking passengers; whereby also, the armature remaining at all times at full speed, the car can be checked, for example, to a speed of four and one-half miles per hour from eighteen miles per hour instantly or gradually and current given back into the line by so doing, the motor operating then as a dynamo; whereby also the car can be run continuously at a slow speed—as, for example, four and a half miles per hour—at crossings, curves, or switches, or in crowded streets, with the armature running at its full or most economical speed and without the necessity of causing the friction brake-band to slip on its brake-wheel, and thus occasioning wear of parts, heat, and loss or waste of power; whereby also the car can be used to shove heavy loads caused, for instance, by cars breaking down ahead of it, or to climb grades too steep to be climbed by ordinary electric cars, and all this, too, with the armature running at its proper and most economical speed and without the necessity of causing the friction brake-band to slip on its brake-wheel, and thus occasioning wear, heat, and loss of power; whereby also for emergency stops by opening the trolley-circuit, the same mechanism at the same time closing a local circuit from end of series field-magnet of motor to ground and also throwing reversing-switch, the motor is turned into a dynamo on short circuit and thus operates as a most efficient brake and stops the car more quickly than can be done in any other way; whereby also in descending hills in case the trolley comes off or the power shuts down and the car-brake is disabled by moving same switch, as just above mentioned, and operating either of the friction brake-bands of the planet-gear speed-reduction mechanism the car can be perfectly controlled on the steepest grade, and whereby also in running downhill, the trolley connection being maintained, the motor may be temporarily converted into a dynamo and current generated and forced back into the line by the gravity of the car as it descends the hill.

These results are accomplished chiefly, and herein my invention primarily consists, by combining with the car and its electric motor a double-reduction planet-gear mechanism for communicating motion from the armature of the motor to the car-axle, said mechanism having two independent friction-brakes. When the single-reduction brake is applied, firm set, the speed of the car-axle in respect to that of the armature will be reduced in the ratio, for example, of three and one-half to one, and when the other or double-reduction brake is applied, firm set, the armature revolving at the same or its most economical speed the speed of the car-axle will be reduced in the ratio, for example, of fourteen to one.

The invention further consists in connection with this double-reduction mechanism between the armature of the motor and the car-axle in providing the field-magnet of the motor with both series windings and shunt windings or coils.

My invention further consists in the novel devices and novel combinations of parts and devices herein shown and described, and more particularly pointed out in the claims.

Figure 40:
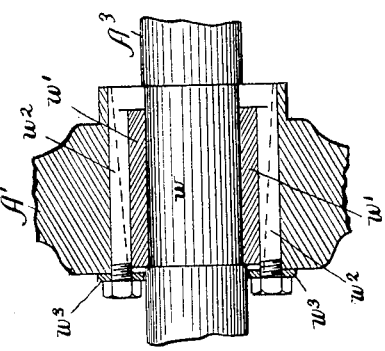
Figure 25:
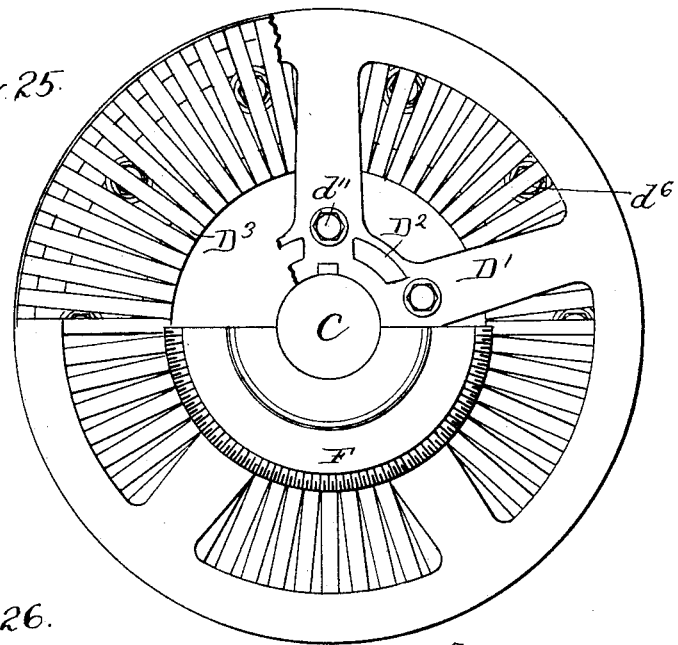
Figure 26:
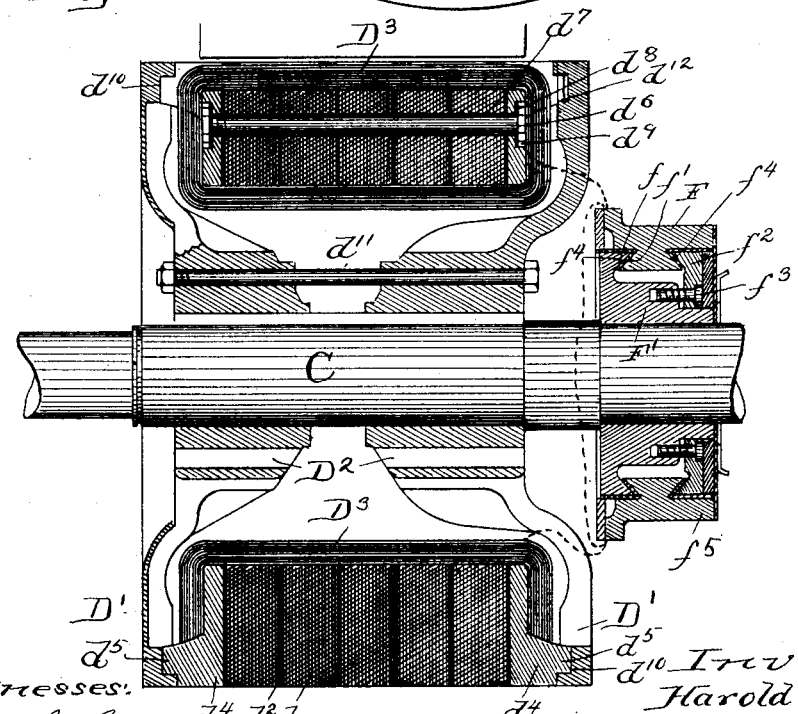
Figure 27:
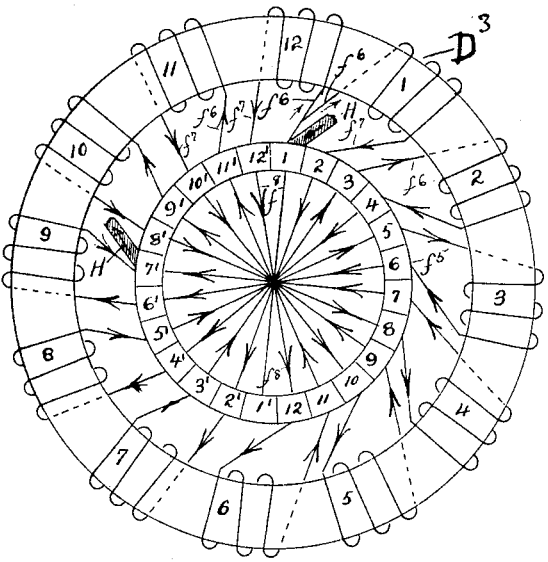
Figure 28:
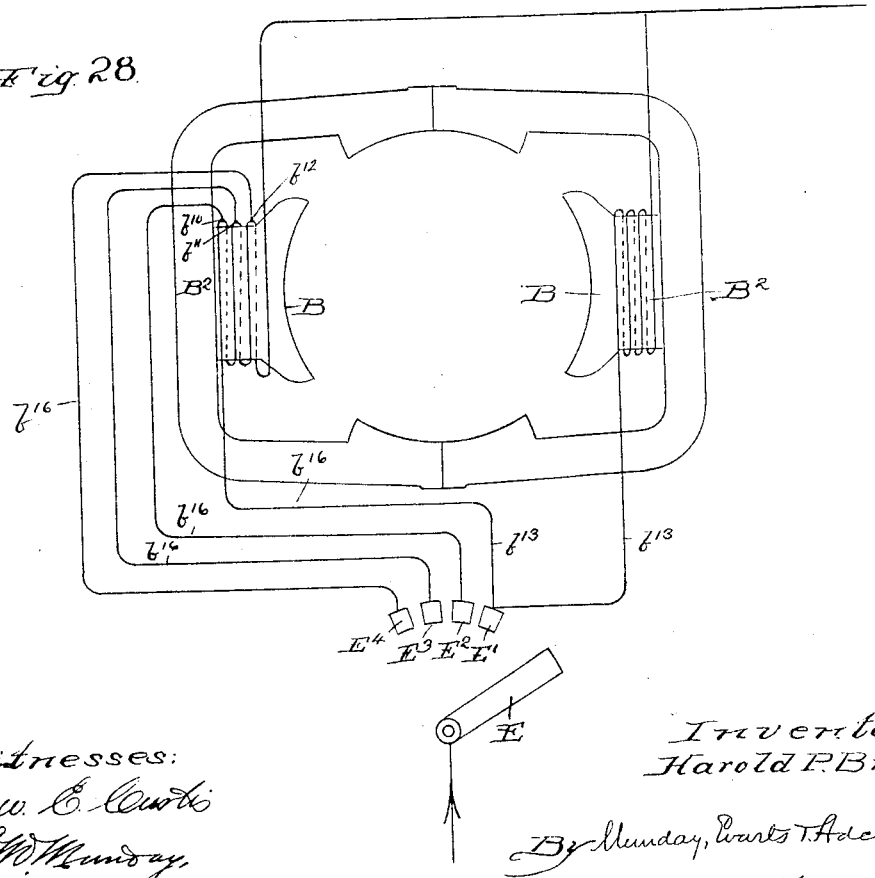

In the accompanying drawings, which form a part of this specification, and in which similar letters of reference indicate like parts, Figure 1 is a side elevation of an electric-motor car embodying my invention. Fig. 2 is a top or plan view of the electric motor and the car-axle and reducing-gear with which it is connected. Fig. 3 is an elevation of the same. Fig. 4 is an enlarged plan view of the motor, showing also a diagram of the circuits. Fig. 5 is a sectional plan of the planet-gear double-reduction mechanism for communicating motion from the motor-shafts to the car-axle and reducing the speed of the latter in respect to the former, as required from time to time. Figs. 6, 7, and 8 are cross-sections on lines 6 6, 7 7, and 8 8, respectively, of Fig. 5. Figs. 9, 10, 11, and 12 are enlarged detail views of the mechanism for operating the friction-brake band of the double-reduction planet-gear mechanism. Figs. 13, 14, 15, 16, and 17 are enlarged detail views of the field-magnet frame and pole-piece. Figs. 18, 19, and 20 are enlarged detail views of the commutator-brush holders. Fig. 21 is an enlarged detail sectional view showing the metal-tape winding and method of retaining same in place. Figs. 22, 23, and 24 show the method of connecting the flexible wire leads with the metal-tape terminals. Figs. 25 and 26 are enlarged detail views of the armature. Fig. 27 is a diagram of the armature and commutator connection, using, for the sake of clearness, but twelve coils and twenty-four segments instead of the greater number required in practice. Fig. 28 is a diagram of the series-field connections, showing the means of reducing the strength of the field in order to increase the speed of the motor and of keeping equal the number of ampere-turns on each magnet $B^2$. Fig. 29 is an elevation of the switch and brake controlling devices. Fig. 30 is a top or plan of the same. Fig. 31 is a section on line 31 31 of Fig. 30. Figs. 32, 33, and 34 are detail sections on lines 32 32, 33 33, and 34 34 of Fig. 29. Figs. 35, 36, and 37 are details of the brake-operating mechanism. Figs. 38 and 39 are respectively top and bottom views of the switch. Fig. 40 shows the manner of fastening the wheels of the axle. Fig. 41 is a plan of the motor and truck.

In the drawings, A represents an electric-motor car; $A'$, the truck-frame; $A^2$, the car-wheels, and $A^3$ the car-axles. The car-axles $A^3$ are furnished with pulleys $A^4$, having V-grooves $A^5$ in their periphery for the rope-band $A^6$ to travel in and by which power is transmitted from one car-axle to the other. The rope-band $A^6$ or one loop of it also passes around a take-up or tightener pulley $A^7$, mounted in a movable or adjustable slide $A^8$.

B is the motor-frame, the same also comprising the field-magnet pole-pieces of the motor.

C is the armature-shaft, and D the armature of the electric motor.

The field-magnet pole-piece B has four poles $b$ $b$ $b'$ $b'$, and it is made in two parts or sections, (marked B B,) the same being split and united at the neutral points $b^2$ $b^2$, so as to maintain an unbroken magnetic circuit in the two adjoining quadrants. The two parts B B of the pole-piece are divided in a vertical plane and secured together by bolts $b^3$, passing through ears or lugs $b^4$ on each of the two adjoining halves of the pole-piece, and the meeting faces of the two parts B B at $b^2$ are furnished with countering grooves and shoulders $b^5$ $b^6$, so as to relieve the bolts $b^3$ from any shearing strain. The two similar and opposite poles $b$ $b$ each consist in part of a central integral core (to which the reference-letter $b$ is particularly applied) and in part of the supplemental removable collar portion $b^7$, attached to the core portion $b$ by bolts $b^9$, the core portion having a shoulder $b^8$ to receive the collar portion $b^7$. The field-magnet coil $B^2$ is thus adapted to be slipped ready wound on the core portion $b$ of the pole, and the supplemental coil $B^3$ can also be wound on the removable collar portion $b^7$ of the pole before it is put in place.

The frame B B is furnished with integral brackets $B'$ to receive and support the boxes and bearings $C'$ of the armature-shaft, the same being secured in place by a cap $B^4$ and bolts $B^5$. The motor-frame B B is supported at one end on the car-axle $A^3$, to which it is secured by boxes or bearings $B^6$ $B^6$, furnished with removable caps $B^7$, attached by bolts $B^8$. The other part of the motor-frame B B is provided with a lug or projection $B^9$ and is supported from the truck-frame by a bolt or connection $B^{10}$, furnished with coil-spring $B^{11}$.

The field-magnet coils $B^2$ $B^3$ of the motor are in part connected as a series and in part as a shunt field.

To vary the strength of the series field and at the same time maintain the two opposite poles of equal strength, I employ a system of switch connection which is clearly illustrated in the diagram view Fig. 28, and by which the total current divides between the fraction of the coil on one pole and the remainder of the coil on that pole (flowing in the opposite direction) plus the coil upon the opposite pole inversely in proportion to the resistance of the two paths, thus maintaining the magnetic strength of the two poles practically equal. To accomplish this, the movable switch-arm E is moved into connection with a series of contact-pieces $E^2$ $E^3$ $E^4$, which are connected by wires $b^{16}$ $b^{16}$ to different parts or sections $b^{10}$ $b^{11}$ $b^{12}$, &c., of the series field-coil $B^2$ on one of the two opposite poles, and the two opposite coils $B^2$ $B^2$ are connected together by a wire $b^{13}$, which leads to the first contact-piece $E'$.

The coils $B^2$ $B^3$ are all preferably formed of flat metal tape, the individual turns being insulated from each other by interposed insulating-tape $b^{14}$, made preferably of asbestos paper impregnated or coated on both sides with partly burned or carbonized shellac or other waterproofing material, the edges $b^{15}$ of the insulating-tape being wrapped around or folded about the edges of the metal tape, as indicated in Fig. 21.

The armature D has a core consisting of a series of separate annular disks $d$, preferably made of soft black sheet-iron, so that the oxid or black coating on the surface of the iron disks or sheets will serve to a greater or less extent to insulate or segregate electrically the separate disks from each other, while at the same time the disks are clamped closely and rigidly together. The oxid or black coating on the surface of the sheets possesses an appreciable electric resistance. At intervals between the series of thin flat core-plates $d$ I place insulating disks or rings $d^2$, preferably made of mica or asbestos. I find that ordinarily about six of these insulating-disks $d^2$, in connection with the black iron disks $d$, will be sufficient to employ for an ordinary-sized motor. This materially economizes space and increases the power of the motor for a given size, as very little space in the aggregate is taken up by the few insulating-plates $d^2$ employed. Where, as has frequently been done heretofore, insulating-disks have been inserted alternately with the core-disks, a material portion of the space is thus occupied by the insulating-disks, thus materially increasing the size of the armature.

The series of core-disks $d$ and insulating-disks $d^2$ are clamped between a pair of end plates or rings $d^4 d^4$, made of magnetic metal, preferably of iron or steel, and having on their outer faces projecting teeth $d^5$, which connect with the spiders $D' D'$, which are secured to the armature-shaft C. The armature end plates or rings $d^4$ are secured together by clamp-bolts $d^6$, which are insulated from the core-rings $d$ and from the end plates $d^4$ by a tube of asbestos paper or mica $d^7$ and washers $d^8$ of similar material. The armature end plates $d^4$ have countersinks $d^9$ to receive the head and nut of the clamp-bolt $d^6$. The spiders $D'$ have grooves or notches $d^{10}$ to receive the teeth or projections $d^5$ on the end plates $d^4$. The spiders $D' D'$ are secured or clamped together by bolts $d^{11}$. The armature end plates are also secured in place on the spiders $D' D'$ by peripheral keys $d^{12}$, which extend between the teeth $d^5$ of the armature end plates and in or near the center of the arms of the spiders, as indicated in Fig. 26. The spiders $D'$ are provided with pockets $D^2$, cored out therein at the time they are cast. These pockets are for use in balancing the armature when it is completed by filling one or more of the pockets to a greater or less extent, as may be necessary, with lead or other metal.

$D^3 D^3$ are the armature-coils, the same being made, preferably, of flat metal tape with interposed insulating-tape of asbestos paper. The coils $D^3$ are wound around the ends of the clamp-bolts $d^6$ and cover the heads of the same, thus enabling the coils to be placed close together without any intervening space between for the clamp-bolts. The armature preferably has about sixty coils, though the number may of course be varied. In the diagram view Fig. 27, showing the armature connection, for convenience, however, only twelve coils are shown.

F is the segmental ring constituting the commutator, secured to the shaft C by a hub or sleeve $F'$, having undercut or dovetail projections $f$, which engage a dovetail projection $f'$ on the commutator segmental ring, and is secured in place by a clamp-ring $f^2$, attached by screws $f^3$ to the sleeve $F'$, the commutator segmental ring F and hub $F'$ being insulated from each other by interposed insulation $f^4$.

The commutator has double the number of segments $f^5$ than there are coils $D^3$ on the armature, being an even number of coils and an even number of segments on the commutator.

The armature is a two-parallel connected one for a four-pole motor, the diametrically opposite coils being connected together in series, as is clearly shown in the diagram view Fig. 27. The opposite commutator-segments are connected together, thus forming two paths of equal resistance through the armature. In this view, Fig. 27, the twelve coils shown are numbered consecutively from 1 to 12, and the twenty-four commutator-segments are numbered in two series from 1 to 12, consecutively, and from 1' to 12', consecutively, so that the two corresponding numbers—as, for example, 3 3'—come diametrically opposite each other. To each of the commutator-segments $f^5$ is connected one of the two terminals of one of the coils $D^3$, (the coils and commutator-segments which are connected together being marked with corresponding numbers) with the exception of the two segments 1 and 1'. One of these (marked 1) is connected to the terminals $f^6 f^6$ of the first and last coils, the same being contiguous and marked 1 and 12, respectively, and the other segment (marked 1') is not connected to the terminals of any coil, excepting of course through its diametrically opposite segment (marked 1.) By this system of connection it will thus be seen that each segment of the commutator has connection with two coils. The segments 1 and 1' being connected with the coils 1 and 12 and, for example, the segments 11 11' being connected with the coils marked 11 and 6, and so on. The outgoing terminals leading from the commutator-segment to the coil are marked $f^6 f^6$, and the ingoing terminals leading from the coil to the commutator-segments are marked $f^7$, while the wires connecting the diametrically opposite segments are marked $f^8$.

H H are the commutator-brushes. The brushes H are held radially to the commutator by the pivoted brush-holder $H'$. This brush-holder is pivoted to the frame at $h$ and has a gravity counterbalance-arm $H^2$, so as to prevent the brush from jarring from the commutator when the car to which the motor is applied is passing over crossings or switches or when from other causes the motor may be subjected to jarring motion. The counterbalance-arm H² is made hollow, so that it may be filled to a greater or less extent, as required, with lead or other metal to counterbalance the brush and brush-holder arm and thus cause the brush and holder to be supported at or near their center of gravity. The brush H is mechanically clamped to the brush-holder H' by a clamp H³, operated by a toggle arm or lever H⁴, which is pivoted at $h'$ to the holder H' and at $h^2$ to the clamp H³. As the bearing-face of the clamp H³ against the brush H and a line joining the pivots $h'$ $h^2$ are arranged so as to make a very obtuse angle or approximate a straight line, the lever H⁴ acts in the nature of a toggle and gives a very powerful, firm, and secure clamping action on the brush. The toggle-lever H⁴ itself is also operated and held firm set by a screw H⁵, threaded in an arm H⁶, which is secured to the brush-holder arm H' by a pin $h^3$. The set-screw H⁵ is locked against turning by a spring $h^4$, attached to the arm H⁶, and which fits against the head $h^5$ of the screw H⁵. H⁷ is the tension-spring, attached at one end to the brush-holder arm H' and at its other end to an eyebolt $h^6$, secured to and projecting from the pivot pin or shaft $h$ of the brush-holder H'. The tension-spring H⁷ is furnished with an insulating-bushing $h^7$ at its point of attachment with the eyebolt $h^6$ or at its point of attachment with the brush-holder H', one or both, in order to prevent the current from passing through the spring and thus destroying or varying the tension or elasticity thereof. The eyebolt $h^6$ projects through a slot or opening $h^8$ in the brush-holder H', and it thus serves not only as a point of attachment for the tension-spring H⁷, but also to hold the brush-holder longitudinally in place on its pivot or shaft $h$ and also as a stop or limit of the radial motion of the brush-holder H' on its shaft $h$. H⁸ is a flexible wire or cable electrical connection between the brush-holder H' and its pivot or shaft $h$. By this means the resistance between the pivoted brush-holder and its shaft $h$ is materially lessened, the electrical connection being much more perfect, especially where the fit between the brush-holder and its pivot becomes a little loose or imperfect from wear or other cause. In setting the brush the arm H⁶ is thrown back until its end $h^9$ strikes the commutator, serving to hold up the brush-holder H' at the proper distance for a new setting of the brush.

Motion is communicated from the motor-shaft C to the car-axle A³ by means of a gear C², which meshes with a gear C³ on a sleeve surrounding the car-axle and which communicates motion to the car-axle through a friction-brake planet-gear double-reduction mechanism. This mechanism comprises an internal gear-wheel M, having a friction-brake surface or wheel M', a pinion-disk N, carrying planet-gears $n\,n$, which mesh with the internal gear M and revolve around a gear $n'$, which is secured to or formed integral with the sleeve P, which is loose upon the car-axle and to which is secured or keyed the brake O, which is keyed to the gear C³, driven by the pinion C² on motor-shaft C.

O is the supplemental friction brake wheel or disk, likewise keyed or secured to the sleeve P, as before stated. The internal gear M is loose upon the sleeve P and the planet-gear disk N is secured fast to the axle A³.

S is a friction-brake applicable to the brake-wheel M' and consisting, preferably, of a band made in two parts encircling said brake-wheel. This brake is mounted upon the stationary frame of the machine.

T is the revolving or supplemental brake, which is applied to the supplemental brake-wheel O, and which is mounted upon and revolves with the internal gear M or parts connected therewith.

The internal gear M has a hollow shell made in two separable parts bolted together, each comprising a hub portion, a disk portion, and a flange portion, the latter constituting the internal gear M M², which incloses the pinion-disk N and its pinions $n$, and which is provided with bearing sleeves or hubs M³ M³, one of which fits upon the sleeve P and the other upon the sleeve or hub N' of the disk N. Bushings $m$, preferably of bronze metal, are interposed between the bearing-surfaces of the sleeve P, hub N', and bearing-surfaces M³ M³ of the internal gear M. Similar bronze bushings $m'\,m'$ are interposed between the shaft A³ and the inner periphery of the sleeve P, and like bushings $m^3$ are interposed between the bearing M³ and the bearing of the frame B. This frame B may be of any suitable construction adapted to give support and bearing to the motor, reducing-gear, and other parts. Its preferred construction is that indicated in the drawings, and it may be made in any desired number of parts suitably bolted or connected together.

The brake S preferably consists of two half-circular bands of metal furnished with a fiber or other lining $s$, the two halves of which are adapted to be placed or set together by a pair of screws S' S', having each right and left hand threads $s'\,s^2$, working in nuts $s^3\,s^4$, fixed in the sleeves $s^5\,s^5$ at each extremity of the semicircular bands S S. The screws S' are journaled in suitable bearings S², secured to the bands S S and to the surrounding frame. The adjustable right and left threaded nuts $s^3\,s^4$ are fixed in place by set-screws $s^6$. By loosening these set-screws and turning the nuts on the screw the position of the nuts in respect to the screw may be adjusted in proper position, so that the movement of the operating-lever will properly apply the brake-band to the brake-wheel.

The other brake-band T for the supplemental brake-wheel O is or may be of similar construction to the brake S, just above described, and its corresponding parts are designated by reference-letters, T indicating the brake-band; T', the operating-screw; T², the bearings for said screws; T³, the right-and-left-threaded nuts; t, the fiber linings for the brake-bands; t' t², the right and left threads on the operating-screws; t⁶, the set-screws for fixing the nuts T in position in relation to the sleeve surrounding the nuts, and T⁴ is the operating-lever. T⁵ is the sleeve surrounding the nut T³, which is fixed thereto by the set-screw t⁶. As the brake-band T T is carried by or mounted upon the internal gear M or its shell M² and revolves therewith the operating-levers T⁴ for the screws T' of said brake-band are operated through the medium of a sliding collar K on the sleeve R. Collar K is connected by the pivoted levers K' to the operating arms or levers T⁴ through the pivoted connecting-links K², and to prevent the operating arms or levers T⁴ from binding they are furnished with swivel-joints T⁷. The sliding collar K is operated by a brake-lever K³. The brake-lever K³ is connected to the collar K by a flanged sleeve K⁴, screw-threaded to the collar K⁵ of the lever, which sleeve is furnished with two sets of ball or antifriction bearings K⁶ K⁶, one on each side of the collar K, so as to relieve the revolving collar K from friction with the non-revolving collar K⁵ of the operating-lever. The studs K⁷, fixed in shell M², cause collar K to revolve with it.

It will be observed that in my present improvement the friction-brake S is applied to the internal gear-wheel M instead of to the planet-gear-carrying disk N, as is done in my Patent No. 449,752 and in my pending application, Serial No. 415,685. An important and material improvement is effected by this change, as I thus accomplish the new result of reducing the speed of the driven shaft A³ from that of the driving-sleeve P in the proportion of four to one when gears n and n' are of the same size, because the planet-gears are thus carried around the internal gear M in the direction of its revolution, thus causing one revolution to be lost at each turn, whereas by the manner in which the parts are combined, as shown in my former patent and application above referred to, the reduction of speed is only in the proportion of three to one. By this new combination of the parts together I also secure the important result of causing the planet-gears n n to revolve at the slowest speed when doing the heaviest work—that is to say, when the friction-brake S is applied with the most force—and to revolve at the swifter speed when doing the lightest work—that is to say, when the friction-brake S is applied with little or no force—whereas by the old construction of these parts, as shown and described in my former patent and application above referred to, the planet-gears n n were caused to revolve at the swiftest speed when subjected to the heaviest work or load. By the new combination the wear is materially reduced and the mechanism runs lighter and is rendered more durable.

It will be understood by those skilled in the art that this feature of my present improvement may be employed either in combination with or without the double-reduction feature first above described and which involves the use of two independent friction-brakes S and T, the brake S to effect a single reduction of the speed and the brake T a double or further reduction, according as the one of the other is applied.

The operation of this double-reduction device is as follows: When neither brake S nor T is applied and the driving-shaft C is in motion, its gear C² will turn the gear C³ in the opposite direction, say to the left. As C³ is keyed to the sleeve P, which is integral with pinion n', the latter will revolve pinions n to the right at the same speed and they will turn internal gear M to the right at one-third the speed of pinion n. If now the stationary brake S be applied with a slight pressure, the movement of internal gear M to the right will be checked somewhat and pinion-disk N and axle A³ will be slowly turned to the left, the speed of N and the power delivered to it being proportional to the speed of n and the brake-pressure on M. When sufficient pressure is applied to the brake S to entirely check the motion of internal gear M to the right, the pinion-disk N will be turned to the left at one-quarter the speed of pinion n' and it will carry the shaft A³ with it. There is now a double reduction of speed of, say, fourteen to one between shaft C and shaft A³, and the pinions n will revolve at one-half the speed at which they revolve when idle or doing no work. When the shaft C is in motion, as before, and the single-reduction brake T is applied with a slight pressure, the movement of internal gear M to the right is checked and pinion-disk N and axle A³ are turned to the left with a speed and amount of power proportional to the speed and pressure of the brake T and the brake-wheel O. If the pressure on the brake T be gradually increased until the backward movement of internal gear M is checked, N is again driven at one-quarter the speed of n' and there is the same double reduction as before between shaft C and shaft A³. If the pressure on brake T be still further increased, internal gear M will begin to move to the left, thereby reducing the speed of gears n and increasing the speed of pinion-disk N and shaft A³. If sufficient pressure be now applied, the brake T will be locked to the brake-wheel O, the internal gear will now rotate at the same speed as the pinion n' and the axle A³, and the pinions n will no longer rotate on their own axes. We now have a single reduction between C and A³ of, say, three and one-half to one. With this device all ratios of reduction from nothing up to fourteen to one can be smoothly obtained with the double-reduction brake S, and all ratios from nothing to three and one-half to one with the single-reduction brake T. This is therefore well adapted for use on a railway motor-car where great power at slow speed is necessary for starting. It is evident that by making the gear $n'$ smaller or larger than the gears $n$ the ratio of reduction can be varied as desired.

Another advantage of this device is in its use as a brake. If when the mechanism as shown in Fig. 1 is under full headway, at a single reduction of, say, three and one-half to one it is desired to check the speed, the brake T is released and the brake S applied. The momentum of the moving parts would at once tend to drive shaft $A^3$ at four times its former or normal speed with a ratio of one to fourteen. The mere mechanical work in so driving $A^3$ is sufficient to soon bring the speed of C down to its normal speed when at a double reduction; but when, as shown herein, the shaft C is connected to an electric motor having a shunt-field coil $B^3$ $B^3$ this increase of speed above its normal rate, through the momentum of the car, will turn the motor into a dynamo, thus giving back current into the line and sharing the work of the dynamos at the power-station. For example, a car of this type has climbed a hill at the rate of six miles an hour and required fifty amperes in so doing. On returning it ran down the same hill at the rate of twelve miles an hour with the switch E E' closed and the double-reduction brake T applied. The ammeter showed that the motor acting as a dynamo put back into the line fifteen amperes.

As the bushings $m$ $m'$ $m^3$ need occasional replacings the axle $A^3$ should be provided with removable wheels. To effect this, a wide but shallow groove $w$ is turned on axle $A^3$. Into this is slipped a beveled bronze bushing $w'$, cut into halves and planed down slightly on the edges for compression. The wheel is put into place and four or more holes bored through same, the holes starting at or near the meeting lines of bushing $w'$ and wheel $A^2$, which has a corresponding taper bore. Into these holes the hook-bolts $w^2$ are inserted, the hook clasping the back of the bushings and the nuts of said bolts applying on washer $w^3$, which rests upon hub of wheel $A^2$. By then tightening the nuts the wheel is forced into proper position and the bushings $w'$ clamped on the axle. The wheel can be easily removed when desired and then firmly replaced in exactly its former position. In order to prevent excessive production of heat or wear of surfaces when brakes S and T are allowed to slip, their inner surfaces are lined with vulcanized fiber bands $s$ $t$, which can be easily replaced when worn.

The friction-brakes S and T are both operated by the driver from either end of the car through the handle-levers U' and U' and the connecting windlass and chain.

The switch mechanism for controlling the motor is clearly illustrated in Figs. 4 and 28 and is preferably constructed as follows: The switch is operated by means of a detachable handle Y, which can be removed from its hollow operating-shaft $y$ only when at central position, when the circuit to the motor is open. Removing the handle allows a detent-lever Y' to drop into a corresponding notch $Y^2$, thereby locking the hollow operating-shaft in place. At the lower end of this shaft, below the car-floor, is a wheel $x$, with a stud $x'$, to which is attached a connecting-rod $x^2$, that moves the main switch-lever E. Moving the operating-handle either way from the center causes the switch-lever E to approach the contact-pieces E' $E^2$, &c., and touch one after the other of them in turn, thereby increasing the speed of the motor. Moving the handle Y toward the center opens the circuit. Continuing the backward motion of the handle in the same direction causes a lever $r$, projecting from the hollow shaft, to engage a slide-rod $r'$ and thus throw the reversing-switch $R^4$. After this is thrown the further motion of the handle Y in the same direction causes the wheel $x$, by engagement with the tooth or projection on the slide-rod $r'$, to lock the reversing-switch mechanism in place, so that it cannot be accidentally jarred from its proper position, and then makes contact with the contact-pieces E' $E^2$, &c. Thus one set of contact-pieces E' $E^2$ serves for varying the speed both forward and backward instead of requiring a double set. On the rocker-arm R is an insulated contact-piece R', that when the main circuit from trolley through switch E, contact E', wire $b^{13}$ through motor to ground is wide open, closes circuit between the two insulated switch-points $R^2$ and $R^3$. One of these switches is placed on each end of the car, but a single reversing-switch $R^4$ is used, which can be operated from either end of the car to make connection with the contact-pieces $R^5$ $R^6$. When both main switches E E' are open, a supplemental or brake circuit is closed, leading from the outer end of the series field at point E', through contact-piece R' and switch-points $R^2$ $R^3$ at one end of the car, through the same at the other end of the car, and then to the ground through frame of the truck and the rail, and back through switch $R^4$, the armature, and the series field to E'. Therefore if when the car is in motion the operating-handle is moved to the off or central position and then far enough beyond to throw the reversing-switch the motor becomes a plain series dynamo on a short circuit and its current will act as a powerful brake if either friction-brake S or T be applied. The car when running at a speed of twenty miles an hour can be stopped in two rail-lengths by this means, or it can be perfectly controlled on a hill when trolley is off and wheel-brakes are out of order, for its speed on the steepest grade when the double-reduction brake is applied will not exceed two miles an hour. For emergency stops this method is better than reversing the motor, for by reversing the car-wheels are apt to slip backward, thereby greatly reducing the traction on the rail and allowing the car to slide quite a distance. The gradual increase of dynamo-current caused by this method cushions the stops and prevents the wheels from slipping. When either main switch E E' is closed, the ground connection at R' R² R³ has already been opened. The reversing-switch R⁴ is of the ordinary construction. As the shunt-field is discharged by the opening of the main circuit the motor acts in this case as a plain series dynamo. It is therefore necessary to throw the reversing-switch after closing the brake-circuit before the motor can be caused to generate a local current and act to check the motion of the car.

The operation of the apparatus will be readily understood by those skilled in the art.

At both ends of the car, inclosed within hollow shaft $y$, is the friction-brake shaft U. It is provided with an operating-crank U', which folds out of the way when not in use, thus allowing switch-operating handle Y to be removed. Turning U in one direction winds up a chain which applies friction-brake S and at the same time unwinds chain leading to brake T, and vice versa. As it is difficult at some positions to apply power to a brake-crank a pair of ratchet-wheels $u$ $u$, one right and one left, are attached to the top of shaft U. When crank U' is in the center, the dog $u'$ in double ratchet $u^2$ rests in a stationary central slot $u^3$, thus holding both ends of the ratchet out of the wheel-teeth. Moving crank either way from the center lifts $u'$ from the slot, compresses one of the springs $u^4$, and forces the opposite end of ratchet $u^2$ into the teeth of one wheel $u$, thus turning the shaft with the crank, the ratchet-wheel V, and ratchet V', below the car-floor, holding the shaft in any position in which it is left. After moving crank U' in one direction as far as force can be advantageously applied to it, say for a quarter of a revolution, it can be moved backward through the same arc and the ratchet $u^2$ will snap over one or more teeth in ratchet-wheel $u$. The movement can then be repeated and the chain further tightened, or to take up the slack between the two chains, one or more complete revolutions may be made. By releasing ratchet V' and returning the crank to the center slot $u^3$ forces the ratchet $u^2$ out of the teeth in wheel $u$ and allows the tightened chain to unwind. When the operator leaves one end of the car, he is obliged to fold up crank U' in order to remove operating-handle Y, and must therefore release either chain and lock the ratchets $u^2$ from the ratchet-wheel $u$. The ratchet-wheels V have a corresponding double-pointed ratchet V', which is normally held in a central position by the spring $v$. By placing the foot on either button $v'$ the spring is compressed and one end of V' forced into the corresponding teeth of its ratchet-wheel.

The groove A⁵ of the pulley A⁴ has a rubber or compressible cushion A²⁰, forming the bottom of the groove.

I claim—

1. The combination with a car, and a motor for driving the same of a double-reduction planet-gear friction-brake mechanism for communicating and reducing motion from the motor-shaft to the axle of the car, said mechanism being provided with two friction brake-wheels and brakes, one of said brakes being mounted on the stationary frame and the other on a revolving part of the mechanism, substantially as specified.

2. In an electric-motor car, the combination of the car-axle with an electric motor, a planet-gear disk or wheel carrying planet-gears, an internal gear meshing therewith, a sleeve loose on the car-axle and furnished with a pinion meshing with said planet-gears, means for communicating motion from the motor-shaft to said sleeve, a friction brake-wheel and friction-brake, and a supplemental brake-wheel, and a revolving supplemental brake engaging said supplemental brake-wheel, substantially as specified.

3. In an electric-motor car, the combination of the car-axle, with an electric motor, a planet-gear disk or wheel carrying planet-gears, an internal gear meshing therewith, a sleeve loose on the car-axle and furnished with a pinion meshing with said planet-gears, means for communicating motion from the motor-shaft to said sleeve, a friction brake-wheel and friction-brake, and a supplemental brake-wheel and a revolving supplemental brake engaging said supplemental brake-wheel, mechanism for operating said first-mentioned brake and mechanism for operating said supplemental brake, substantially as specified.

4. In an electric-motor car, the combination of the car-axle with an electric motor, a planet-gear disk or wheel carrying planet-gears, an internal gear meshing therewith, a sleeve loose on the car-axle and furnished with a pinion meshing with said planet-gears, means for communicating motion from the motor-shaft to said sleeve, a friction brake-wheel and friction-brake, and a supplemental brake-wheel and a revolving supplemental brake engaging said supplemental brake-wheel, a sliding collar surrounding the car-axle, and suitable connecting mechanism for operating said revolving supplemental brake by the movement of said sliding collar, substantially as specified.

5. In an electric-motor car, the combination of the car-axle with an electric motor, a planet-gear disk or wheel carrying planet-gears, an internal gear meshing therewith, a sleeve loose on the car-axle and furnished with a pinion meshing with said planet-gears, means for communicating motion from the motor-shaft to said sleeve, a friction brake-wheel and friction-brake and a supplemental brake-wheel and a revolving supplemental brake engaging said supplemental brake-wheel, a sliding collar surrounding the car-axle, and suitable connecting mechanism for operating said revolving supplemental brake by the movement of said sliding collar, and devices connecting said sliding collar with the brake lever or handle, substantially as specified.

6. In an electric-motor car, the combination of an electric motor with a planet-gear mechanism furnished with the revolving friction-brake T, arranged so that its partial application will effect a double reduction of speed between motor and car-axle, and its full application will effect a single reduction between same, substantially as specified.

7. The combination with a car and a motor for driving the same of a planet-gear mechanism with two independent friction-brakes so arranged that the application of one friction-brake will effect a double reduction of speed between motor and car-axle, and the application of the other will lock together the planet-gears and the internal gear and effect a single reduction of speed between the motor-shaft and car-axle, substantially as specified.

8. The combination with a car and a motor for driving the same, of a main circuit which can be closed by a switch at either end of the car and a brake-circuit leading through contacts at each end of the car, so arranged that the closing of the main circuit will first cause the opening of the brake-circuit and the opening of the main circuit at both ends of the car will cause the closing of the brake-circuit, substantially as specified.

9. The combination with a car and a motor for driving the same of a controlling-switch, a removable handle for same and a lock or detent for locking the switch in position by removing the handle, substantially as specified.

10. The combination with a car and a motor for driving same, of the switch-lever E, connecting-rod $x^2$, stud $x'$, wheel $x$ and handle Y, substantially as specified.

11. The combination with a car and a motor for driving same, of switch-lever E, connecting-rod $x^2$, stud $x'$, cam-wheel $x$, lever $r$, slide $r'$, rod $r^2$, switch $R^1$ and handle Y, substantially as specified.

12. The combination with a car and a motor for driving same, of two sets of brakes and brake-chains, brake-shaft U, crank U', ratchet-wheels $u\ u$, dog $u'$, double ratchet $u^2$, slot $u^3$ and springs $u^4$, substantially as specified.

13. The combination with a car and a motor for driving same of two sets of brakes and brake-chains, brake-shaft U, crank U', ratchet-wheels $u\ u$, dog $u'$, double ratchet $u^2$, slot $u^3$, springs $u^4$, ratchet-wheels V, ratchet V', spring $v$, and rods $v'$, substantially as specified.

14. The combination with a car and a motor for driving same, of a means of transmitting motion from the motor to the car-axle, an axle with a groove $w$, a split beveled bushing W W fitting in said groove, a car-wheel W' having a beveled bore, hook-bolts $w'$, washer $w^2$ and nuts $w^3$, substantially as specified.

HAROLD P. BROWN.

Witnesses:
GODFREY MORGAN,
J. J. SCHOENLEBER.